(12) United States Patent
Ichida et al.

(10) Patent No.: US 8,892,227 B2
(45) Date of Patent: Nov. 18, 2014

(54) IN-VEHICLE DEVICE AND METHOD FOR CONTROLLING THE SAME

(75) Inventors: Takashi Ichida, Anjo (JP); Hiroaki Mizutani, Kariya (JP); Tomohiro Kani, Toyota (JP); Yuichi Ochiai, Toyota (JP); Ichiro Usami, Anjo (JP); Takashi Wada, Okazaki (JP)

(73) Assignees: DENSO CORPORATION, Kariya (JP); Toyota Jidosha Kabushiki Kaisha, Toyota-shi (JP); Aisin Aw Co., Ltd, Anjo (JP)

( * ) Notice: Subject to any disclaimer, the term of this patent is extended or adjusted under 35 U.S.C. 154(b) by 786 days.

(21) Appl. No.: 12/952,298

(22) Filed: Nov. 23, 2010

(65) Prior Publication Data

US 2011/0125299 A1 May 26, 2011

(30) Foreign Application Priority Data

Nov. 24, 2009 (JP) .................. 2009-266190

(51) Int. Cl.
*G06F 17/00* (2006.01)
*G01C 21/26* (2006.01)
*G06F 9/48* (2006.01)

(52) U.S. Cl.
CPC ............... *G01C 21/26* (2013.01); *G06F 9/485* (2013.01)
USPC .......................................... 700/94

(58) Field of Classification Search
USPC .......................................... 700/94
See application file for complete search history.

(56) References Cited

U.S. PATENT DOCUMENTS

| 6,385,638 | B1 * | 5/2002 | Baker-Harvey | 718/107 |
| 2004/0204845 | A1 * | 10/2004 | Wong | 701/210 |
| 2005/0138662 | A1 | 6/2005 | Seto | |
| 2005/0209852 | A1 * | 9/2005 | Beckert et al. | 704/246 |
| 2006/0106958 | A1 * | 5/2006 | Khawand et al. | 710/52 |
| 2007/0124733 | A1 * | 5/2007 | Bril et al. | 718/104 |
| 2008/0130922 | A1 * | 6/2008 | Shibata et al. | 381/302 |
| 2010/0110314 | A1 * | 5/2010 | Kusano | 348/837 |
| 2011/0191783 | A1 * | 8/2011 | Le Moal | 718/105 |

FOREIGN PATENT DOCUMENTS

| JP | H07-191863 A | 7/1995 |
| JP | H10-287188 A | 10/1998 |
| JP | 2002-243488 A | 8/2002 |
| WO | WO 0223329 A2 * | 3/2002 |

* cited by examiner

*Primary Examiner* — Andrew C Flanders
(74) *Attorney, Agent, or Firm* — Posz Law Group, PLC

(57) ABSTRACT

A processing unit executes at least one of a task of a radio tuner, a task of a television tuner, a task of a playback control unit for playback of stored image and sound, a task of an indication unit for indicating image according to image data, a task of a navigation unit for detecting a present position and indicating the detected position on a map, and a task of a route search unit for searching for a route and indicating the searched route on the map, in accordance with a predetermined priority. When execution of multiple tasks by the processing unit exceeds processing performance of the processing unit, a processing suspension unit suspends a task, which satisfies a predetermined condition, among the multiple tasks currently executed by the processing unit, irrespective of a priority of the task.

20 Claims, 5 Drawing Sheets

FIG. 3

| AUTO SELECT CONDITION | | USER SELECT CONDITION |
|---|---|---|
| SUSPENDABLE TASK IN EXECUTION OF ROUTE SEARCH TASK | SUSPENDABLE TASK IN EXECUTION OF AUDIO GUIDANCE TASK | REAR SEAT PRIORITY SETTING |
| 69 — TV IMAGE CTRL TASK<br>68 — TV AUDIO CTRL TASK<br>64 — TV CTRL TASK<br>67 — DVD IMAGE CTRL TASK<br>66 — DVD AUDIO CTRL TASK<br>63 — P/B CTRL TASK<br>65 — CD AUDIO CTRL TASK<br>63 — P/B CTRL TASK<br>62 — RADIO CTRL TASK<br>74 — MAP GENERATION TASK | 68 — TV AUDIO CTRL TASK<br>66 — DVD AUDIO CTRL TASK<br>65 — CD AUDIO CTRL TASK | ON : REAR SEAT PRIORITY<br>OFF : FRONT SEAT PRIORITY |

80
81
82

IN-VEHICLE DEVICE AND METHOD FOR CONTROLLING THE SAME

CROSS REFERENCE TO RELATED APPLICATIONS

This application is based on and incorporates herein by reference Japanese Patent Application No. 2009-266190 filed on Nov. 24, 2009.

FIELD OF THE INVENTION

The present invention relates to an in-vehicle device. In particular, the present invention relates to an in-vehicle device configured to activate a navigation function and a function to playback sound and image. The present invention further relates to a method for controlling the in-vehicle device.

BACKGROUND OF THE INVENTION

In recent years, an in-vehicle device having a navigation function is further provided with multiple functions, such as a tuning function of one-segment television broadcasting, in addition to a playback function of sound and image stored in CD or DVD. In general, such an in-vehicle device performs a multitasking operation to activate a navigation function, a playback and an indication function of sound and an image, and the like simultaneously. For example, JP-A-10-287188 and JPA-2005-199998 disclose multitasking operations for processing each of preset tasks within a specific time period, processing a task with high priority preferentially, and processing multiple tasks efficiently by utilizing a time-sharing operation.

Nevertheless, new functions are added to an in-vehicle device year by year. Consequently, an in-vehicle device is required to execute a large quantity of processings. In order to handle such a large quantity of processings quickly, modification of a hardware component, such as enhancement of processing speed of a processing unit such as a CPU and expansion of a memory device, is required for every model change of an in-vehicle device. Furthermore, processing load applied to a processing unit such as a CPU and a signal bus becomes significantly high in order to process various functions simultaneously. Consequently, processings are hardly completed within a predetermined time period. Thus, a task with a low priority may not be processed, and consequently malfunctions such as timeout and hang-up may occur.

SUMMARY OF THE INVENTION

In view of the foregoing and other problems, it is an object of the present invention to produce an in-vehicle device configured to process a task irrespective of priority, thereby to achieve stable operation without modification and enhancement of a hardware component such as a processing unit. It is another object of the present invention to produce a method for controlling the in-vehicle device.

According to one aspect of the present invention, an in-vehicle device comprises a radio tuner configured to receive a radiofrequency wave and playback a content of the received radiofrequency wave. The in-vehicle device further comprises a television tuner configured to receive a television frequency wave and playback a content of the received television frequency wave. The in-vehicle device further comprises a playback control unit configured to control playback of an image and a sound stored in a storage medium. The in-vehicle device further comprises a first system including: a first audio output unit configured to output a sound according to an audio signal generated by the radio tuner, the television tuner, and the playback control unit; and a first indication unit configured to indicate an image according to image data generated by the television tuner and the playback control unit. The in-vehicle device further comprises a map data storage unit configured to store map data as a source of a map image indicated by the indication unit. The in-vehicle device further comprises a navigation unit configured to detect a present position and superimpose the detected present position on a map indicated by the indication unit. The in-vehicle device further comprises a route search unit configured to search for a route in accordance with a predetermined procedure and superimpose the searched route on the map indicated by the indication unit. The in-vehicle device further comprises a processing unit configured to: control the radio tuner, the television tuner, the playback control unit, the indication unit, the navigation unit, and the route search unit; and execute at least one of a task of the radio tuner, a task of the television tuner, a task of the playback control unit, a task of the indication unit, a task of the navigation unit, and a task of the route search unit, in accordance with a predetermined priority. The in-vehicle device further comprises a processing suspension unit configured to suspend a task, which satisfies a predetermined suspension condition, among a plurality of tasks currently executed by the processing unit, irrespective of the priority of the task, when execution of the plurality of tasks by the processing unit exceeds a processing performance of the processing unit.

According to one aspect of the present invention, a method for controlling an in-vehicle device, the method comprises causing, in accordance with a predetermined priority, a processing unit to execute at least one of: a task of a radio tuner for receiving a radiofrequency wave and playback a content of the received radiofrequency wave, a task of a television tuner for receiving a television frequency wave and playback a content of the received television frequency wave, a task of a playback control unit for controlling playback of an image and a sound stored in a storage medium, a task of an indication unit for indicating an image according to image data generated by the television tuner and the playback control unit, a task of a navigation unit for detecting a present position and superimpose the detected present position on a map indicated by the indication unit, and a task of a route search unit for searching for a route in accordance with a predetermined procedure and superimpose the searched route on the map indicated by the indication unit. The method further comprises suspending a task, which satisfies a predetermined suspension condition, among a plurality of tasks currently executed by the processing unit, irrespective of the priority of the task, when execution of the plurality of tasks by the processing unit exceeds a processing performance of the processing unit.

BRIEF DESCRIPTION OF THE DRAWINGS

The above and other objects, features and advantages of the present invention will become more apparent from the following detailed description made with reference to the accompanying drawings. In the drawings:

FIG. 3 is a schematic view showing a condition table of the in-vehicle device according to the embodiment;

DETAILED DESCRIPTION OF PREFERRED EMBODIMENTS

Figure 1:
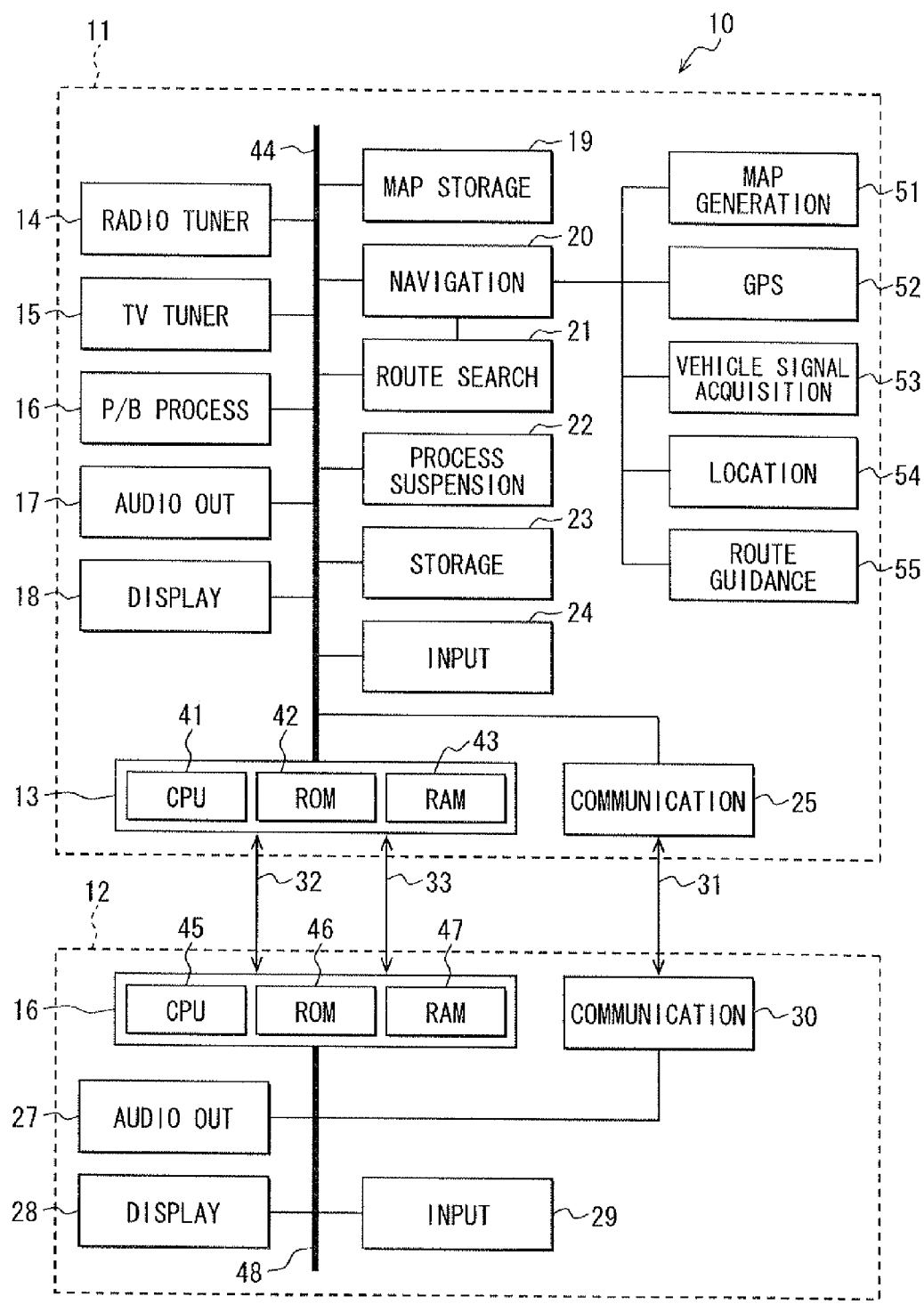
FIG. 1 is a block diagram showing an in-vehicle device according to an embodiment of the present invention.

As follows, an embodiment of an in-vehicle device will be described with reference to drawings. First, an electric configuration of an in-vehicle device 10 will be described with reference to FIG. 1. The in-vehicle device 10 is configured of a front seat device 11 and a rear seat device 12. The front seat device 11 is configured of, for example, a car navigation device equipped in a dashboard of a vehicle and the like. The rear seat device 12 is configured of, for example, a terminal unit and the like. The terminal unit may be equipped in an upper side of a rear seat or a rear side of a front seat in the vehicle.

The front seat device 11 includes a processing unit 13, a radio tuner 14, a television tuner 15, a playback processing unit 16, an audio output unit 17, a display unit 18, a map data storage unit 19, a navigation unit 20, a route search unit 21, a processing suspension unit 22, a storage unit 23, an operation input unit 24, and an in-vehicle communication unit 25. The rear seat device 12 includes a processing unit 26, an audio output unit 27, a display unit 28, an operation input unit 29, and an in-vehicle communication unit 30. The front seat device 11 and the rear seat device 12 of the in-vehicle device 10 perform transmission and reception of an operation signal, a request signal, and the like through an in-vehicle LAN 31. The in-vehicle LAN 31 communicates the in-vehicle communication unit 25 with the in-vehicle communication unit 30. The front seat device 11 is connected with the rear seat device 12 through an audio signal line 32 and an image signal line 33. In the present configuration, an audio signal processed by the front seat device 11 is transferred to the rear seat device 12 through the audio signal line 32, and an image signal processed by the front seat device 11 is transferred to the rear seat device 12 through the image signal line 33.

The processing unit 13 is configured of a microcomputer including a CPU 41, a ROM 42, and a RAM 43. The processing unit 13 is connected with the radio tuner 14, the television tuner 15, the playback processing unit 16, the audio output unit 17, the display unit 18, the map data storage unit 19, the navigation unit 20, the route search unit 21, the processing suspension unit 22, the storage unit 23, the operation input unit 24, and the in-vehicle communication unit 25 through a bus 44. The processing unit 26 is configured of a microcomputer including a CPU 45, a ROM 46, and a RAM 47. The processing unit 26 is connected with the audio output unit 27, the display unit 28, the operation input unit 29, and the in-vehicle communication unit 30 through a bus 48. The CPU 41 of the processing unit 13 controls the entire in-vehicle device 10 including the front seat device 11 and the rear seat device 12, according to a computer program stored in the ROM 42 and/or the storage unit 23. Part of the navigation unit 20, the route search unit 21, and the processing suspension unit 22 of the front seat device 11 are configured of computer programs executed by the processing unit 13. The part of the navigation unit 20, the route search unit 21, and the processing suspension unit 22 may be hardware devices. Similarly, the CPU 45 of the processing unit 26 controls the entire rear seat device 12 according to a computer program stored in the ROM 46. The processing unit 26 is configured to perform minimum operations for producing functions required to the rear seat device 12. Therefore, most of functions of the rear seat device 12 are processed by the processing unit 13 of the front seat device 11.

The radio tuner 14 is configured of a demodulation circuit, an amplification circuit, an audio data generation circuit, and a control circuit for controlling these circuits (not shown). As generally known, the radio tuner 14 performs demodulation and amplification of a radiofrequency wave received from an external object of the vehicle in the demodulation circuit and the amplification circuit and generates radio voice data of a set channel in the voice data generation circuit. The generated radio voice data is outputted to the processing unit 13. On receiving input of a channel select signal from the operation input unit 24 or a channel select signal from the operation input unit 29 of the rear seat device 12 through the in-vehicle LAN 31, the radio tuner 14 switches the present channel to a channel corresponding to the inputted channel select signal.

The television tuner 15 is configured of a demodulation circuit, an amplification circuit, an audio data generation circuit, a image data generation circuit, and a control circuit for controlling these circuits (not shown). As generally known, the television tuner 15 performs demodulation and amplification of a television wave received from an external object of the vehicle in the demodulation circuit and the amplification circuit and generates television audio data and television image data of a set channel in the audio data generation circuit and the image data generation circuit. The generated television audio data and the generated television image data are outputted to the processing unit 13. On receiving input of a channel select signal from the operation input unit 24 or a channel select signal from the operation input unit 29 of the rear seat device 12 through the in-vehicle LAN 31, the television tuner 15 switches the present channel to a channel corresponding to the inputted channel select signal.

The playback processing unit 16 is included in a DVD player and/or a CD player (not shown) for playing a storage media such as a DVD and a CD. The playback processing unit 16 is configured of a data reading circuit, a image data generation circuit, an audio data generation circuit, and a control circuit for controlling these circuits (not shown). As generally known, the playback processing unit 16 causes the data reading circuit to read digital data stored in the storage medium and causes the image data generation circuit and the audio data generation circuit to generate payback image data and payback audio data. The generated payback image data and payback audio data are outputted to the processing unit 13. On receiving input of an operation signal from the operation input unit 24 or an operation signal from the operation input unit 29 of the rear seat device 12 through the in-vehicle LAN 31, the playback processing unit 16 performs a processing corresponding to the inputted operation signal such as a playback signal or a fast forward signal.

Each of the audio output unit 17 and the audio output unit 27 includes a speaker and an amplification circuit (not shown). The audio output unit 17 amplifies various kinds of audio data outputted from the processing unit 13 in the amplification circuit and outputs sound from the speaker according to the audio data. The audio output unit 27 amplifies various kinds of audio data outputted from the processing unit 13 and transferred through the audio signal line 32 in the amplification circuit and outputs sound from the speaker according to the audio data.

Each of the display unit 18 and the display unit 28 includes a display panel and a display control circuit (not shown). The display panel may employ a collar liquid crystal panel, an organic electroluminescence panel, or the like. The display unit 18 causes the display control circuit to process various kinds of image data outputted from the processing unit 13 and causes the display panel to indicate an image according to the image data. The display unit 28 causes the display control circuit to process various kinds of image data outputted from the processing unit 13 and transferred through the image signal line 33. The display unit 28 further causes the display panel to indicate an image according to the image data. The map data storage unit 19 stores map data for generating a map image indicated on the display unit 18. The map data includes various kinds of data such as road map data, landmark data, map matching data, destination data, and table data. The road map data is formed of links connecting multiple nodes. The table data is for converting traffic information into road data. The map data includes a place name, a facility name, and the like as point names.

The navigation unit 20 includes a map image generation unit 51, a GPS unit 52, a vehicle signal acquisition unit 53, a location unit 54, the route search unit 21, and a route guidance unit 55. The map image generation unit 51 generates a map image according to the map data stored in the map data storage unit 19 and causes the display unit 18 to indicate the generated map image. The GPS unit 52 detects the present position of the vehicle equipped with the in-vehicle device 10 according to a signal received from a GPS satellite. The vehicle signal acquisition unit 53 detects various information such as an acceleration and a turning angle of the vehicle equipped with the in-vehicle device 10, thereby to detect the present position of the vehicle equipped with the in-vehicle device 10 in cooperation with the GPS unit 52. The location unit 54 identifies the present position of the vehicle detected by the GPS unit 52 and the vehicle signal acquisition unit 53 and superimposes the identified present position on the map image indicated on the display unit 18. The route search unit 21 is integrated with the navigation unit 20. The route search unit 21 searches for a path from the present position of the vehicle or a start point to a destination. In this case, the start point and the destination are inputted from the operation input unit 24, and the present position is identified by the location unit 54. The route guidance unit 55 extracts an intersection, a traffic information, and the like, on which the vehicle needs to change the direction on the path searched by the route search unit 21, and guides the vehicle to the destination according to the extracted intersection, the traffic information, and the like. The route guidance unit 55 outputs guidance audio data to the processing unit 13. The processing unit 13 transfers the guidance audio data obtained from the route guidance unit 55 to the audio output unit 17 of the front seat device 11.

The storage unit 23 includes a mass storage media such as a nonvolatile memory and an HDD. The storage unit 23 stores a computer program for the in-vehicle device 10 and the like. The storage unit 23 may be integrated with the map data storage unit 19. The storage unit 23 may be integrated with the ROM 42 and the RAM 43 of the processing unit 13.

Each of the operation input unit 24 and the operation input unit 29 includes various kinds of input switch devices (not shown). The input switch devices of the operation input unit 24 and/or the operation input unit 29 may include a mechanical switch device and/or a touch sensor. The mechanical switch device may be located in the circumference of the display unit 18 and/or the display unit 28. The touch sensor may be integrated with the display unit 18 and/or the display unit 28. Each of the operation input unit 24 and the operation input unit 29 receives various commands inputted to the in-vehicle device 10 to set a destination of the vehicle and to switch screens and functions of the display unit 18 and the display unit 28. The in-vehicle device 10 is configured to receive a command for display mode alteration. Specifically, for example, the display mode alteration may include to change a map scale, to select a menu screen, to search for a path, to start route guidance, to correct a present position, to tune the radio tuner 14 and/or the television tuner 15, to change a sound volume and/or an image quality, and the like. The operation input unit 24 and the operation input unit 29 may be equivalent to a condition input unit.

Subsequently, the processing suspension unit 22 and its function will be described in detail.

(Category and Priority of Task)

Figure 2:
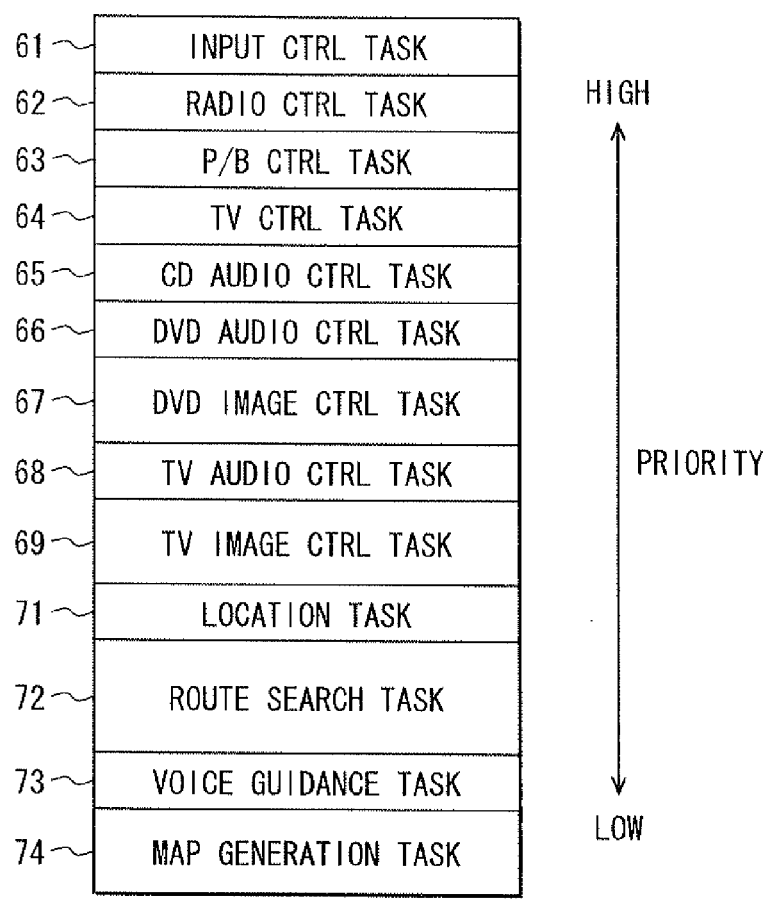
FIG. 2 is a schematic view showing priority and processing load of tasks of the in-vehicle device according to the embodiment.

Category and priority of a task, which is processed by the processing unit 13, will be described in advance of description of a processing of the processing suspension unit 22. As shown in FIG. 2, the processing unit 13 is assigned with tasks including an operation input unit control task 61, a radio control task 62, a playback control task 63, a television control task 64, a CD audio control task 65, a DVD audio control task 66, a DVD image control task 67, a television audio control task 68, a television image control task 69, a present location task 71, a route search task 72, a voice guidance task 73, and a map image generation task 74, which are listed in order from high priority task. The priority of each task is not limited to the present example and may be arbitrarily modified according to a property of each device such as a performance and/or a function. FIG. 2 is a schematic diagram showing tasks. The height of each task exhibits an occupancy rate of the task in the processing unit 13, i.e., a quantity of a processing load caused by the task in the processing unit 13. In the example of FIG. 2, the processing load of the route search task 72 is the largest, and the processing load of each of the DVD image control task 67 and the television image control task 69 is the second largest.

As follows, processing of each task will be described. The operation input unit control task 61 is executed on receiving input from the operation input unit 24 manipulated as a mechanical switch device or a touch sensor. Each of functions of the in-vehicle device 10 is activated and deactivated on receiving input from the operation input unit 24. Therefore, the highest priority is assigned to the operation input unit control task 61. The radio control task 62 includes a processing of the radio tuner 14. The playback control task 63 includes a processing of the playback processing unit 16 for playback control of the DVD and CD. The television control task 64 includes a processing of the television tuner 15.

The CD audio control task 65 includes a processing of the playback processing unit 16 for payback audio data of a played CD. The DVD audio control task 66 includes a processing of the playback processing unit 16 for payback audio data of a played DVD. The DVD image control task 67 includes a processing of the playback processing unit 16 for payback image data of a played DVD. The television audio control task 68 includes a processing of the television tuner 15 for television audio data. The television image control task 69 includes a processing of the television tuner 15 for television image data.

The present location task 71 includes a processing of the navigation unit 20 for detection of the present position of the vehicle. The route search task 72 includes a processing of the route search unit 21 for searching for a route from a start point to a destination according to an input signal obtained from the operation input unit 24. The voice guidance task 73 includes a processing of the route guidance unit 55 for guiding the path, which is searched by the route search unit 21, with sound. The map image generation task 74 includes a processing of the map image generation unit 51 for generating a map image according to the map data and causing the display unit 18 to indicate the generated map image.

(Task Suspension Condition)

Next, one example of a task suspension condition will be described with reference to FIG. 3. As shown in FIG. 3, the storage unit 23 stores a condition table 80 including task suspension conditions. The table defines a suspendable task, which can be suspended when the processing unit 13 executes a predetermined task, for each of predetermined tasks. Specifically, in the case of the condition table 80 shown in FIG. 3, the task suspension conditions include an automatic select condition 81 and a user select condition 82. The automatic select condition 81 is assigned with a suspendable task, which can be automatically suspended when the processing unit 13 executes a predetermined task, according to the predetermined task.

For example, in the condition table 80 of FIG. 3, suspendable tasks, when the processing unit 13 executes the route search task 72, include the television image control task 69, a television relationship task group including the television audio control task 68 and the television control task 64, the DVD image control task 67, a DVD playback task group including the DVD audio control task 66 and the playback control task 63, a CD playback task group including the CD audio control task 65 and the playback control task 63, the radio control task 62, and the map image generation task 74. Further, in the condition table 80, suspendable tasks, when the processing unit 13 executes the voice guidance task 73, include the television audio control task 68, the DVD audio control task 66, and the CD audio control task 65. In the automatic select condition 81, tasks are respectively assigned with priorities, which become higher on the upper side upward, i.e., on the side of the television image control task 69 in FIG. 3.

The user select condition 82 has a configuration variable according to preference of a user to assign a higher priority to the rear seat device 12 or the front seat device 11. For example, when a rear seat priority is set to OFF (deactivated), priority is assigned to the front seat device 11, and function of the rear seat device 12 is partially regulated. A user can set the user select condition 82 by operating the operation input unit 24. The user select condition 82 is not limited to assignment of priority to a device on the side of the front seat or the rear seat and may be used for assignment of priority to a device having another function. In the task suspension conditions, the automatic select condition 81 is applied with higher priority than the user select condition 82.

Subsequently, operation of the processing suspension unit 22 according to the above-described task suspension conditions will be described in detail.

(Front Seat Priority)

First, an example when the rear seat priority is set to OFF in the user select condition 82 to assign priority to the front seat device 11 will be described. In an example of FIG. 4, the front seat device 11 activates a navigation function to superimpose the present position on a map image and a CD playback function to play a CD. The rear seat device 12 activates a television function to receive television broadcasting. In this case, the display unit 18 of the front seat device 11 indicates a map image including the present position, and the display unit 28 of the rear seat device 12 indicates a television image. Further, the audio output unit 17 of the front seat device 11 outputs sound of the CD currently played by the playback processing unit 16, and the audio output unit of the rear seat device 12 outputs television sound corresponding to the television image of the display unit. When the front seat device 11 activates the navigation function and the CD playback function and when the rear seat device 12 activates the television function in this way, the processing unit 13 executes tasks on the left side in FIG. 4 in order from the task with higher priority. Specifically, the processing unit 13 executes the operation input unit control task 61, the playback control task 63, the television control task 64, the CD audio control task 65, the television audio control task 68, the television image control task 69, the present location task 71, and the map image generation task 74, in this case.

Suppose the front seat device 11 executes route search in the present state in which the front seat device 11 activates the navigation function and the CD playback function and when the rear seat device 12 activates the television function. Referring to FIG. 2, the processing unit 13 needs to execute the route search task 72, which requires a high processing load, to perform route search. When the route search task 72 is further executed in the condition where the front seat device 11 activates the navigation function and the CD playback function and the rear seat device 12 activates the television function, processing load of the total tasks may exceed processing performance of the processing unit 13.

Figure 4:
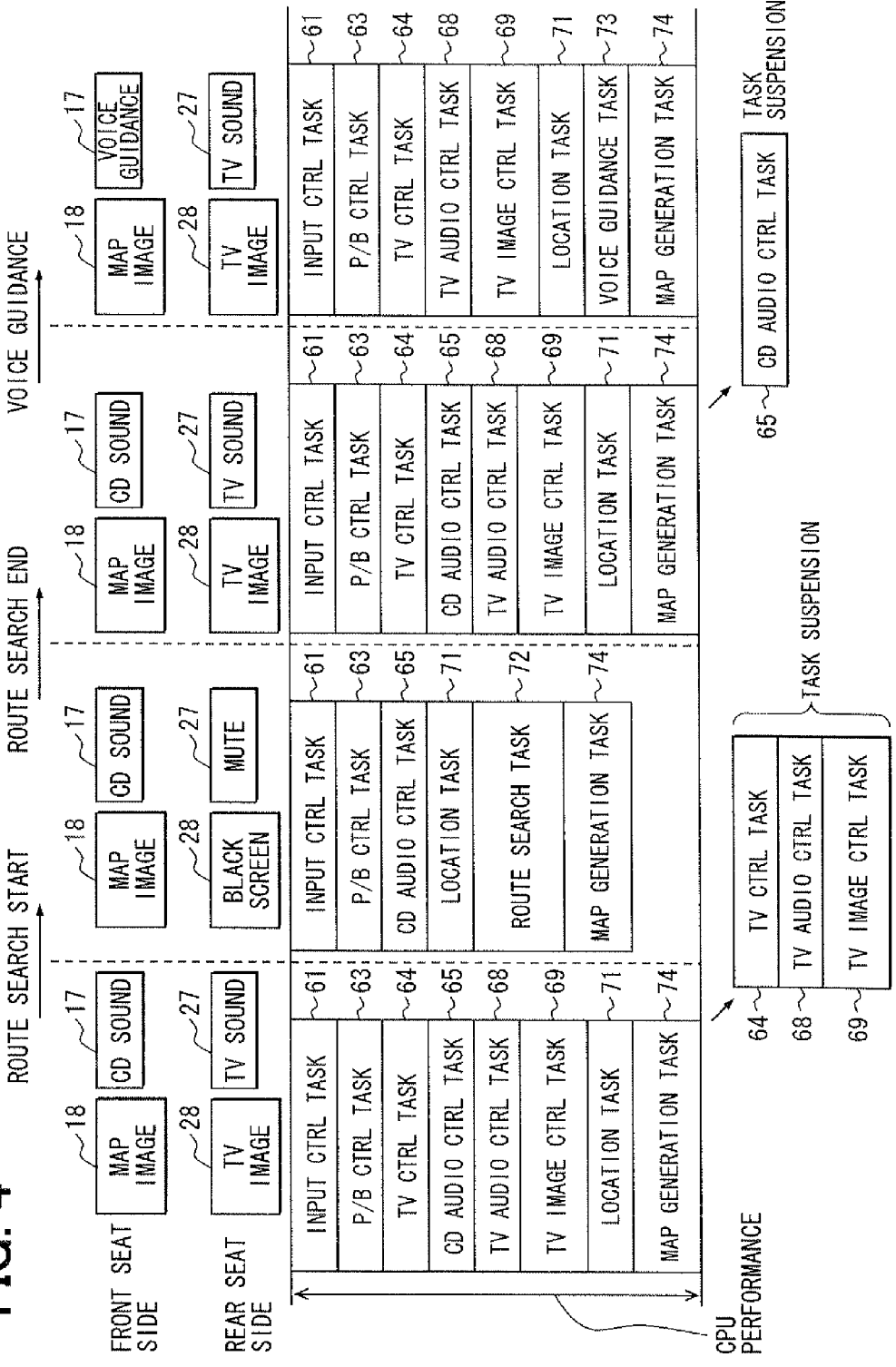
FIG. 4 is a schematic view showing a processing of the in-vehicle device in a front seat priority state according to the embodiment.

In consideration of this, the processing suspension unit 22 suspends a part of tasks, which are currently executed by the processing unit 13, for executing the route search task 72 according to the above-described task suspension conditions. Specifically, the processing suspension unit 22 extracts a task, which can be suspended for executing the route search task 72, from the condition table 80 shown in FIG. 3 including the task suspension conditions. According to the priority of suspension in the condition table 80, the television image control task 69, the television audio control task 68, and the television control task 64 are suspendable for executing the route search task 72 in the front seat priority state. Therefore, as shown in FIG. 4, the processing suspension unit 22 causes the processing unit 13 to suspend the television image control task 69, the television audio control task 68, and the television control task 64 among the tasks executed immediately before execution of the route search task 72. Consequently, the front seat device 11 causes the audio output unit 17 to output sound of the CD while causing the display unit 18 to indicate a map image including the present position. The rear seat device 12 causes the display unit 28 to stop indication of the television image and causes the audio output unit 27 to stop output of the television sound. As a result, in the front seat device 11, the display unit 18 indicates the map image while the audio output unit 17 outputs sound of the CD. Contrary, in rear seat device 12, the display unit 28 causes a black screen, and the audio output unit 27 becomes silent. In this way, when priority is given to the front seat side, the television function of the rear seat device 12 is temporarily regulated on condition that the front seat device 11 executes route search.

The processing unit 13 terminates the route search task 72 on completion of the route search. Therefore, the processing suspension unit 22 causes the processing unit 13 to resume the operation before the route search. Thereby, the processing unit 13 resumes execution of the television image control task 69, the television audio control task 68, and the television control task 64, which are once suspended by the processing suspension unit 22. Thus, the display unit 28 resumes indication of the television image, and the audio output unit 27 resumes output of the television sound, in the rear seat device 12. In this way, regulation of the television function of the rear seat device 12 caused by execution of the route search in the front seat device 11 is temporary. Therefore, regulation of a part of the functions of the rear seat device 12 for execution of the task of the front seat device 11 imposes small inconvenience to a user viewing the television image and listening the television sound of the rear seat device 12 on the rear seat side.

On acquisition of a traveling route to be guided through the route search, the route guidance unit 55 performs voice guidance at an intersection and the like, on which the vehicle needs to change the course. At this time, the processing unit 13 needs to execute the voice guidance task 73 further to perform the voice guidance. When the voice guidance task 73 is further executed in the condition where the front seat device 11 activates the navigation function and the CD playback function and the rear seat device 12 activates the television function, processing load of the total tasks may exceed processing performance of the processing unit 13.

In consideration of this, the processing suspension unit 22 suspends a part of tasks, which are currently executed by the processing unit 13, according to the above-described task suspension conditions for executing the voice guidance task 73. Specifically, the processing suspension unit 22 extracts a task, which can be suspended for executing the voice guidance task 73 in the front seat priority state, from the condition table 80 shown in FIG. 3 including the task suspension conditions. According to the priority of suspension in the condition table 80, the television audio control task 68, the DVD audio control task 66 and the CD audio control task 65 are suspendable for executing the voice guidance task 73. It is noted that, execution of the voice guidance task 73 imposes a relatively small processing load to the processing unit 13. Therefore, all the television audio control task 68, the DVD audio control task 66, and the CD audio control task 65 need not be suspended, and it suffices to suspend a part of these tasks. It is noted that, the front seat device 11 performs the voice guidance. Specifically, the audio output unit 17 of the front seat device 11 outputs sound processed by the voice guidance task 73. Therefore, suspension of a task relevant to another audio function of the front seat device 11 does not impose much inconvenience to a user. In consideration of this, in the front seat priority state shown in FIG. 4, the processing suspension unit 22 suspends the CD audio control task 65, which is relevant to an audio function of the front seat device 11, among the tasks executed immediately before the voice guidance task 73. Consequently, the front seat device 11 causes the audio output unit 17 to output voice guidance while causing the display unit 18 to indicate a map image including the present position. Contrary, regulation of a function is not imposed on the rear seat device 12. Therefore, the display unit 28 indicates a television image and the audio output unit 27 outputs sound in the rear seat device 12.

The processing unit 13 terminates the voice guidance task 73 on completion of the voice guidance. Therefore, the processing suspension unit 22 causes the processing unit 13 to resume the operation before the voice guidance. In this way, the processing unit 13 resumes the CD audio control task 65, which is once suspended by the processing suspension unit 22. Thus, the front seat device 11 resumes output of the CD sound. As described above, regulation of the CD playback function of the front seat device 11 caused by execution of the voice guidance of the front seat device 11 is temporary. Playback of a CD and voice guidance are audio functions relevant to sound output. Therefore, suspension of sound output caused by playback of a CD during execution of voice guidance enables a user to recognize the voice guidance easily. Therefore, regulation of a part of the functions of the front seat device 11 for execution of the task of the front seat device 11 imposes small inconvenience to a user operating the navigation function of the front seat device 11.

(Rear Seat Priority)

Subsequently, an example when the rear seat priority is set to ON in the user select condition 82 to assign priority to the rear seat device 12 will be described. In an example of FIG. 5, similarly to the front seat priority state, the front seat device 11 activates a navigation function to superimpose the present position on a map image and a CD playback function to play a CD. The rear seat device 12 activates a television function to receive television broadcasting. In this case, the display unit 18 of the front seat device 11 indicates a map image including the present position, and the display unit 28 of the rear seat device 12 indicates a television image. Further, the audio output unit 17 of the front seat device 11 outputs sound of the CD currently played by the playback processing unit 16, and the audio output unit 27 of the rear seat device 12 outputs television sound corresponding to the television image of the display unit 28. When the front seat device 11 activates the navigation function and the CD playback function and when the rear seat device 12 activates the television function in this way, the processing unit 13 executes tasks on the left side in FIG. 5 in order from the task with higher priority. Specifically, the processing unit 13 executes the operation input unit control task 61, the playback control task 63, the television control task 64, the CD audio control task 65, the television audio control task 68, the television image control task 69, the present location task 71, and the map image generation task 74, in this case.

Suppose the front seat device 11 executes route search in the present state in which the front seat device 11 activates the navigation function and the CD playback function and when the rear seat device 12 activates the television function. Referring to FIG. 2, the processing unit 13 needs to execute the route search task 72, which requires a high processing load, to perform route search. When the route search task 72 is further executed in the condition where the front seat device 11 activates the navigation function and the CD playback function and the rear seat device 12 activates the television function, processing load of the total tasks may exceed processing performance of the processing unit 13.

Figure 5:
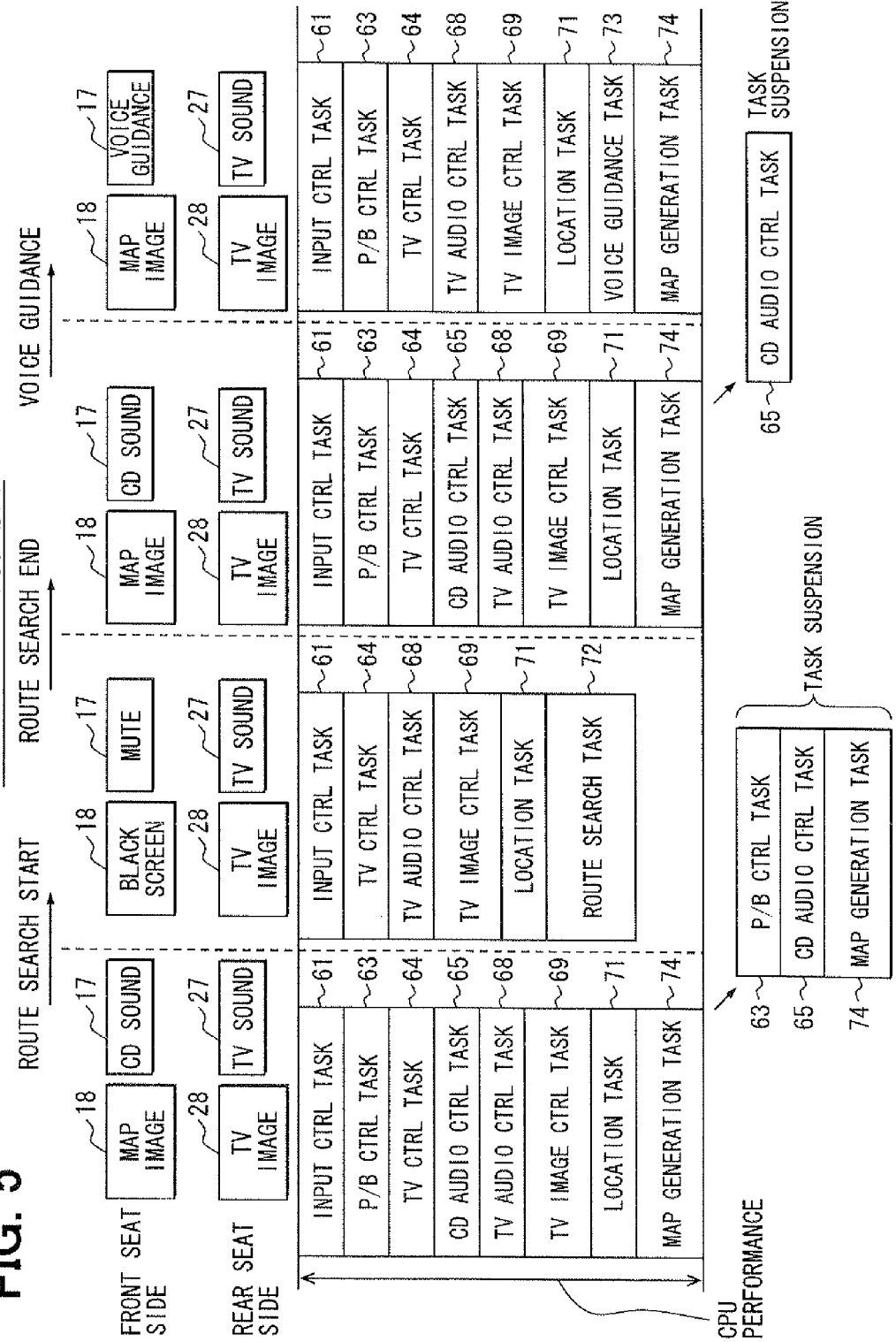
FIG. 5 is a schematic view showing a processing of the in-vehicle device in a rear seat priority state according to the embodiment.

In consideration of this, the processing suspension unit 22 suspends a part of tasks, which are currently executed by the processing unit 13, for executing the route search task 72 according to the above-described task suspension conditions. Specifically, the processing suspension unit 22 extracts a task, which can be suspended for executing the route search task 72, from the condition table 80 shown in FIG. 3 including the task suspension conditions. According to the priority of suspension in the condition table 80, the television image control task 69, the television audio control task 68, and the television control task 64 are suspendable for executing the route search task 72 in the rear seat priority state. However, in the present rear seat priority state, the rear seat device 12 activates the television function. Therefore, the television image control task 69, the television audio control task 68, and the television control task 64 cannot be suspended. Therefore, the processing suspension unit 22 extracts the playback control task 63, the CD audio control task 65, and the map image generation task 74, which are to be suspended, from the condition table 80 according to the priority of suspension, thereby not to disturb the function of the rear seat device 12. Therefore, as shown in FIG. 5, the processing suspension unit 22 causes the processing unit 13 to suspend the playback control task 63, the CD audio control task 65, and the map image generation task 74 among the tasks executed immediately before execution of the route search task 72. Consequently, the front seat device 11 causes the display unit 18 to stop indication of the map image and causes the audio output unit 17 to stop output of the CD sound. Consequently, the display unit 18 causes a black screen, and the audio output unit 17 becomes silent in the front seat device 11. Contrary, the rear seat device 12 causes the display unit 28 to indicate the television image and causes the audio output unit 27 to output of the television sound. In this way, when priority is given to the rear seat side, the navigation function and the CD playback function of the front seat device 11 is temporarily regulated on condition that the front seat device 11 executes route search.

The processing unit 13 terminates the route search task 72 on completion of the route search. Therefore, the processing suspension unit 22 causes the processing unit 13 to resume the operation before the route search. In this way, the processing unit 13 resumes the playback control task 63, the CD audio control task 65, and the map image generation task 74, which are once suspended by the processing suspension unit 22. Thus, the display unit 18 resumes indication of the map image, and the audio output unit 17 resumes output of the CD sound, in the front seat device 11. In this way, regulation of the navigation function and the CD playback function of the front seat device 11 caused by execution of the route search in the front seat device 11 is temporary. In addition, even when the display unit 18 causes a black screen and the audio output unit 17 becomes silent in the front seat device 11 during execution of the route search task 72, such deactivation of the display unit 18 and the audio output unit 17 imposes small influence on a user on the front seat side. Therefore, slight inconvenience is imposed on a user on the front seat side.

On acquisition of a traveling route to be guided through the route search, the route guidance unit 55 performs voice guidance at an intersection and the like, on which the vehicle needs to change the course. At this time, the processing unit 13 needs to execute the voice guidance task 73 further to perform the voice guidance. When the voice guidance task 73 is further executed in the condition where the front seat device 11 activates the navigation function and the CD playback function and the rear seat device 12 activates the television function, processing load of the total tasks may exceed processing performance of the processing unit 13.

In consideration of this, the processing suspension unit 22 suspends a part of tasks, which are currently executed by the processing unit 13, according to the above-described task suspension conditions for executing the voice guidance task 73. Specifically, the processing suspension unit 22 extracts a task, which can be suspended for executing the voice guidance task 73 in the rear seat priority state, from the condition table 80 shown in FIG. 3 including the task suspension conditions. According to the priority of suspension in the condition table 80, the television audio control task 68, the DVD audio control task 66 and the CD audio control task 65 are suspendable for executing the voice guidance task 73. It is noted that, execution of the voice guidance task 73 imposes a relatively small processing load to the processing unit 13. Therefore, all the television audio control task 68, the DVD audio control task 66, and the CD audio control task 65 need not be suspended, and it suffices to suspend a part of these tasks. It is noted that, the front seat device 11 performs the voice guidance. Specifically, in the front seat device 11, the audio output unit 17 outputs sound processed by the voice guidance task 73. Therefore, suspension of a task relevant to another audio function of the front seat device 11 does not impose much inconvenience to a user. In consideration of this, in the rear seat priority state shown in FIG. 5, the processing suspension unit 22 suspends the CD audio control task 65, which is relevant to an audio function of the front seat device 11, among the tasks executed immediately before the voice guidance task 73, similarly to the case in the front priority state. Consequently, the front seat device 11 causes the audio output unit 17 to output voice guidance while causing the display unit 18 to indicate a map image including the present position. Contrary, regulation of a function is not imposed on the rear seat device 12. Therefore, the display unit 28 indicates a television image and the audio output unit 27 outputs sound in the rear seat device 12.

The processing unit 13 terminates the voice guidance task 73 on completion of the voice guidance. Therefore, the processing suspension unit 22 causes the processing unit 13 to resume the operation before the voice guidance. In this way, the processing unit 13 resumes the CD audio control task 65, which is once suspended by the processing suspension unit 22. Thus, the front seat device 11 resumes output of the CD sound. As described above, regulation of the CD playback function of the front seat device 11 caused by execution of the voice guidance of the front seat device 11 is temporary. Playback of a CD and voice guidance are audio functions relevant to sound output. Therefore, suspension of sound output caused by playback of a CD during execution of voice guidance enables a user to recognize the voice guidance easily. Therefore, regulation of a part of the functions of the front seat device 11 for execution of the task of the front seat device 11 imposes small inconvenience to a user operating the navigation function of the front seat device 11.

As described above, in the present embodiment, when execution of multiple tasks exceeds processing performance of the processing unit 13, the processing suspension unit 22 suspends a task, which satisfies a suspension condition, among multiple tasks currently executed, irrespective of the priority of the task. The suspension condition is defined by the condition table 80. The condition table 80 includes predetermined suspension conditions. For example, a large-scale vehicle such as a station wagon includes display units 18, 28 on both the front seat side and the rear seat side. The in-vehicle device 10 may be connected with two or more display units 18, 28. In such a case, even when indication of one of the display units is suspended, such suspension may not cause a problem. As described in the present embodiment, execution of a task, which satisfies the suspension condition, is suspended arbitrarily irrespective of priority, according to another task to be executed by the processing unit 13. Thereby, processing performance required to the processing unit 13 need not be enhanced with respect to the additional task. Consequently, tasks are partially suspended temporarily, and functions of the in-vehicle device 10 are partially regulated. Nevertheless, modification of a hardware component, such as enhancement of a processing speed and a clock rate of the processing unit 13, is not needed. Furthermore, necessary task can be executed irrespective of priority, without disturbance caused by another task. Therefore, by executing a task irrespective of priority, stability of operation can be enhanced, without modification of a hardware component, enhancement of performance of the processing unit 13, and the like.

In addition, according to the present embodiment, a user can input the user select condition 82 of the suspension conditions from the operation input unit 24. Specifically, a user operates the operation input unit 24 to input the user select condition 82 of the suspension conditions whether to give priority to the front seat side or the rear seat side, for example. Thereby, a task, which is suspended by the processing suspension unit 22 when processing load exceeds processing performance of the processing unit 13, is changed according to user's preference. Therefore, steady operation can be secured without enhancement of performance of the processing unit 13 while reducing inconvenience imposed on a user.

Other Embodiments

The invention is not limited to the embodiment described above but is applicable to various embodiments within a scope not departing from the gist thereof. In the above-described embodiment, the route search task 72 and the voice guidance task 73 are additionally executed when the front seat device 11 activates the navigation function and the CD playback function and when the rear seat device 12 activates the television function. The execution mode of the tasks is one example for describing one gist of the present invention. A task suspended by the processing suspension unit 22 may be arbitrarily determined according to, for example, a function currently activated by the front seat device 11, a function currently activated by the rear seat device 12, processing performance of the processing unit 13, category of a task, which can be executed by the in-vehicle device 10, and the like.

Summarizing the above embodiments, a processing suspension unit is configured to suspend a task, which satisfies a suspension condition, among multiple tasks currently executed, irrespective of the priority of the task when execution of multiple tasks by the processing unit exceeds processing performance of the processing unit. The suspension condition is determined beforehand. For example, a large-scale vehicle such as a station wagon includes display units on both the front seat side and the rear seat side. In such a case, in which the in-vehicle device is connected with two or more display units, even when indication of one of the display units is suspended, such suspension may not cause a problem. Suppose that the indication unit on the front seat side indicates a map image of a navigation unit, and the indication unit on the rear seat side indicates a television image. In this case, on determination that necessity for route search arises on the front seat side and execution of a task exceeds processing performance of the processing unit, the operation suspension unit suspends indication of the television image on the rear seat side, irrespective of priority of the task. In this case, indication of the television image on the rear seat side is suspended until the route search on the front seat side is completed. Nevertheless, the processing unit executes the task of the route search on the front seat side. Therefore, even though indication of the television image on the rear seat side is regulated temporarily, the task of the route search on the front seat side is executed quickly irrespective of priority. As described in the present example, execution of a task, which satisfies (corresponds to) the suspension condition, is suspended arbitrarily irrespective of priority, according to another task, which should be executed by the processing unit. Thereby, processing performance required to the processing unit need not be enhanced with respect to the additional task. Consequently, tasks are partially suspended, and functions are partially regulated. Nevertheless, modification of a hardware component such as enhancement of performance of the processing unit is not necessary. Furthermore, a task, which should be executed, can be executed irrespective of priority, without disturbance caused by another task. Therefore, by executing a task irrespective of priority, stability of operation can be enhanced, without modification of a hardware component such as the processing unit and enhancement of a processing speed and a clock rate.

The processing suspension unit may be configured to suspend a task of one system among two systems of an audio output unit and an indication unit when exceeding a processing performance of the processing unit. For example, in a case where audio and image are provided to two systems of the indication unit and the audio output unit, such as the front seat side and the rear seat side, the processing suspension unit may suspend provision of audio and image to either of the front seat side and the rear seat side. In this way, a margin arises in the processing performance of the processing unit. Thus, stable operation can be secured without enhancement of processing performance of the processing unit.

The processing suspension unit may be configured to suspend at least one of a task of a radio tuner, a task of a television tuner, a task of a playback control unit, and a task of a navigation unit for generating a map image, when the processing unit executes a task of route search and when exceeding the processing performance of the processing unit. Playback of a radio sound, playback of a television image, indication of a map image, and the like hardly impose much inconvenience on a user even when being suspended temporarily. In consideration of this, these tasks are suspended when a high processing load for the task of route search is applied to the processing unit, thereby to execute the task of route search quickly. Thus, steady operation can be secured without enhancement of performance of the processing unit while reducing inconvenience imposed on a user.

The processing suspension unit may be configured to suspend at least one of a task of the television tuner for audio processing and a task of the playback control unit for audio processing, when a task of a route search unit for voice guidance is executed. When voice guidance is performed, sound of an audio device such as the television tuner may overlap voice guidance. Therefore, output of such sound of an audio device is not necessary. In consideration of this, when executing the task of voice guidance, the processing suspension unit suspends a processing, which is relevant to sound and overlaps the voice guidance. Thus, steady operation can be secured without enhancement of performance of the processing unit while reducing inconvenience imposed on a user.

The suspension condition may be inputted from a condition input unit. Specifically, a user may operate the operation input unit to input the suspension condition whether to give priority to the front seat side or the rear seat side. Thereby, a task, which is suspended by the suspension unit when processing load exceeds processing performance of the processing unit, can be changed according to user's preference. Thus, steady operation can be secured without enhancement of performance of the processing unit while reducing inconvenience imposed on a user.

The above processings such as calculations and determinations are not limited being executed by the processing units 13, 26. The control unit may have various structures including the processing units 13, 26 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An in-vehicle device comprising:
a radio tuner configured to receive a radiofrequency wave and playback a content of the received radiofrequency wave;
a television tuner configured to receive a television frequency wave and playback a content of the received television frequency wave;
a playback control unit configured to control playback of an image and a sound stored in a storage medium;
a first system including:
a first audio output unit configured to output a sound according to an audio signal generated by the radio tuner, the television tuner, and the playback control unit; and
a first indication unit configured to indicate an image according to image data generated by the television tuner and the playback control unit;
a map data storage unit configured to store map data as a source of a map image indicated by the indication unit;
a navigation unit configured to detect a present position and superimpose the detected present position on a map indicated by the indication unit;
a route search unit configured to search for a route in accordance with a predetermined procedure and superimpose the searched route on the map indicated by the indication unit;
a processing unit configured to:
control the radio tuner, the television tuner, the playback control unit, the indication unit, the navigation unit, and the route search unit; and
execute at least one of a task of the radio tuner, a task of the television tuner, a task of the playback control unit, a task of the indication unit, a task of the navigation unit, and a task of the route search unit, in accordance with a first predetermined priority; and
a processing suspension unit configured to suspend one or more selected tasks from among a plurality of current tasks currently being executed by the processing unit, irrespective of the priority of the one or more selected tasks in accordance with the first predetermined priority, when the processing unit needs to execute a new task, such that execution of the plurality of current tasks plus the new task by the processing unit would exceed a processing performance of the processing unit,
wherein the processing suspension unit suspends the one or more selected tasks from among the plurality of current tasks currently being executed by the processing unit in accordance with a second predetermined priority that is different from the first predetermined priority.

2. The in-vehicle device according to claim 1, further comprising:
a second system including:
a second audio output unit configured to output a sound according to an audio signal generated by the radio tuner, the television tuner, and the playback control unit; and
a second indication unit configured to indicate an image according to image data generated by the television tuner and the playback control unit, wherein
the one or more selected tasks that are suspended by the processing suspension unit are in one of the first system and the second system.

3. The in-vehicle device according to claim 1, wherein the one or more selected tasks are at least one of the task of the radio tuner, the task of the television tuner, the task of the playback control unit, and a task of the navigation unit to cause the indication unit to indicate the map image, when the new task is a task of the route search unit for route search.

4. The in-vehicle device according to claim 1, wherein the one or more selected tasks are at least one of a task of the television tuner for audio processing and a task of the playback control unit for audio processing, when the new task is a task of voice guidance of the route search unit.

5. The in-vehicle device according to claim 1, further comprising:
a condition input unit configured to receive an input of the suspension condition of the processing suspension unit.

6. A method for controlling an in-vehicle device, the method comprising:
causing, in accordance with a first predetermined priority, a processing unit to execute at least one of:
a task of a radio tuner for receiving a radiofrequency wave and playback a content of the received radiofrequency wave;
a task of a television tuner for receiving a television frequency wave and playback a content of the received television frequency wave;
a task of a playback control unit for controlling playback of an image and a sound stored in a storage medium;
a task of an indication unit for indicating an image according to image data generated by the television tuner and the playback control unit;
a task of a navigation unit for detecting a present position and superimpose the detected present position on a map indicated by the indication unit; and
a task of a route search unit for searching for a route in accordance with a predetermined procedure and superimpose the searched route on the map indicated by the indication unit;
receiving a request for the processing unit to execute a new task;
suspending at least one selected task from among a plurality of current tasks currently being executed by the processing unit, irrespective of the priority of the plurality of current tasks in accordance with the first predetermined priority, when execution of the plurality of current tasks plus the new task by the processing unit would exceed a processing performance of the processing unit; and
causing the processing unit to execute the new task,
wherein the suspending of the one or more selected tasks from among the plurality of current tasks currently being executed by the processing unit is performed according to a second predetermined priority that is different from the first predetermined priority.

7. A non-transitory computer readable medium comprising instructions executed by a computer, the instructions including the method according to claim 6.

8. The in-vehicle device according to claim 2, wherein
the processing suspension unit is further configured to assign a priority between the first system and the second system, and
the one or more selected tasks that are suspended are selected based on the priority between the first system and the second system.

9. An in-vehicle device comprising:
a plurality of different operational units, configured to perform a plurality of different functional tasks, respectively;
a processing unit configured to:
control the plurality of different operational units, and execute at least one of the plurality of different functional tasks in accordance with a first predetermined priority; and a processing suspension unit configured to suspend one or more of a plurality of current tasks that are currently being executed by the processing unit, selected from the plurality of different functional tasks, when the processing unit needs to execute a new task, selected from the plurality of different functional tasks, such that execution of the plurality of current tasks plus the new task by the processing unit would exceed a processing performance of the processing unit, wherein the processing suspension unit is configured to suspend the one or more of the plurality of current tasks irrespective of the priority of the different functional tasks according to the first predetermined priority, and the processing suspension unit is configured to suspend the one or more of the plurality of current tasks according to a second predetermined priority different from the first predetermined priority.

10. The in-vehicle device according to claim 9, wherein the plurality of operational units includes at least two of:

a radio tuner configured to receive a radio frequency (RF) wave and playback a content of the received RF wave;

a television tuner configured to receive a television frequency wave and playback a content of the received television frequency wave;

a playback control unit configured to control playback of at least one of an image and a sound stored in a storage medium;

a first system including:
  a first audio output unit configured to output a sound according to an audio signal generated by the radio tuner, the television tuner, and the playback control unit; and
  a first display unit configured to display an image according to image data generated by the television tuner and the playback control unit;

a map data storage unit configured to store map data as a source of a map image indicated by the indication unit;

a navigation unit configured to detect a present position and superimpose the detected present position on a map indicated by the indication unit; and a route search unit configured to search for a route in accordance with a predetermined procedure and superimpose the searched route on the map indicated by the indication unit.

11. The in-vehicle device according to claim 10, wherein the plurality of operational units further includes:

a second system including:

a second audio output unit configured to output a sound according to an audio signal generated by the radio tuner, the television tuner, and the playback control unit; and
  a second indication unit configured to indicate an image according to image data generated by the television tuner and the playback control unit, wherein the one or more selected tasks that are suspended by the processing suspension unit are in one of the first system and the second system.

12. The in-vehicle device according to claim 11, wherein the processing suspension unit is further configured to assign a priority between the first system and the second system, and the one or more selected tasks that are suspended are selected based on the priority between the first system and the second system.

13. The in-vehicle device according to claim 9, further comprising:

a condition input unit configured to receive an input of the suspension condition of the processing suspension unit.

14. The in-vehicle device according to claim 1, wherein the processing unit executes the new task immediately after the processing suspension unit suspends the one or more of the current tasks.

15. The in-vehicle device according to claim 1, wherein the second predetermined priority identifies a subset of tasks from the first predetermined priority.

16. The in-vehicle device according to claim 1, wherein the second predetermined priority identifies a plurality of separate ordered subsets of tasks from the first predetermined priority corresponding to a plurality of possible identities of the new task.

17. The method according to claim 6, wherein the second predetermined priority identifies a subset of tasks from the first predetermined priority.

18. The method according to claim 6, wherein the second predetermined priority identifies a plurality of separate ordered subsets of tasks from the first predetermined priority corresponding to a plurality of possible identities of the new task.

19. The in-vehicle device according to claim 9, wherein the second predetermined priority identifies a subset of tasks from the first predetermined priority.

20. The in-vehicle device according to claim 9, wherein the second predetermined priority identifies a plurality of separate ordered subsets of tasks from the first predetermined priority corresponding to a plurality of possible identities of the new task.

* * * * *